United States Patent
Scoggins et al.

[11] Patent Number: 5,183,538
[45] Date of Patent: Feb. 2, 1993

[54] EXTRACTION PLUS ION EXCHANGE PROCESSING OF A BRINE STREAM

[75] Inventors: Lacey E. Scoggins; Fu M. Lee; Allen T. Chang, all of Bartlesville, Okla.; Wiley D. Perkins, College Station, Tex.

[73] Assignee: Phillips Petroleum Company, Bartlesville, Okla.

[21] Appl. No.: 632,721

[22] Filed: Dec. 24, 1990

[51] Int. Cl.$^5$ .................... B01D 3/14; C07D 207/267
[52] U.S. Cl. ........................................ 203/28; 203/38; 203/43; 203/80; 203/DIG. 6; 528/388; 548/555
[58] Field of Search .................... 203/38, 36, 37, 14, 203/29, 28, 63, 43, 71, 73, 78, 84, 80, DIG. 6; 548/555; 528/388

[56] References Cited
U.S. PATENT DOCUMENTS

| | | | |
|---|---|---|---|
| 3,122,486 | 2/1964 | Skarstrom | 203/38 |
| 3,783,138 | 1/1974 | Miles et al. | 528/388 |
| 3,956,090 | 5/1976 | Scoggin | 528/388 |
| 4,039,428 | 8/1977 | Wei | 203/38 |
| 4,415,729 | 11/1983 | Scoggins et al. | 528/388 |
| 4,831,160 | 5/1989 | Leighton | 548/555 |
| 4,859,781 | 8/1989 | Lee et al. | 548/555 |
| 4,965,370 | 10/1990 | Goetz et al. | 548/555 |
| 4,976,825 | 12/1990 | Iwasaki et al. | 548/555 |
| 5,023,315 | 6/1991 | Ceurvorst et al. | 528/388 |

Primary Examiner—Wilbur Bascomb, Jr.
Attorney, Agent, or Firm—George E. Bogatie

[57] ABSTRACT

A method for recovering a liquid diluent having a low salt content from an organic/aqueous mixture which contains significant quantities of the diluent, an alkali metal salt, and water comprises an integrated process which joins extraction and ion exchange steps and a reaction for the conversion of an alkali metal hydroxide. In the initial step the diluent is extracted from the original mixture employing a suitable extractant material. The extract from the initial step containing diluent, extractant material, along with reduced quantities of water and salt, is passed to an ion exchange column for conversion of the alkali metal salt to its hydroxide. In a following fractional distillation dewatering column the diluent begins to react with the alkali metal hydroxide to form an alkali-metal salt of aminocarboxylic acid which can pass harmlessly through the dewatering column for removal in further following fractional distillation step.

9 Claims, 1 Drawing Sheet

EXTRACTION PLUS ION EXCHANGE PROCESSING OF A BRINE STREAM

This invention relates to recovering a liquid diluent utilized in a polymerization process. In one aspect, it relates to a method for removing salt from a brine stream generated in the production of arylene sulfide polymers. In another aspect, it relates to the removal of salt from an organic/aqueous phase mixture which contains the liquid diluent. In a further aspect, it relates to an integrated process for recovering liquid polymerization diluent which comprises extraction, plus ion exchange, and a subsequent reaction for the conversion of an alkali metal hydroxide.

BACKGROUND OF THE INVENTION

It is common practice in the plastic industry to produce arylene sulfide polymers from sodium hydroxide, sodium hydrosulfide, and p-dichlorobenzene, which are contacted in the presence of a liquid diluent. In U.S. Pat. No. 4,415,729, issued to Scoggins et al. on Nov. 15, 1983, the disclosure of which is incorporated herein by reference, there is disclosed a method of producing polymers from polyhalo-substituted aromatics, alkali metal sulfides and polar organic compounds. Further disclosed in that patent are suitable polar organic solvents which act as diluent materials for the polymerization reaction, and still further, there is disclosed a method for recovering solidified granular poly(arylene sulfide) from a polymerization mixture at a temperature below that at which poly(arylene sulfide) is in a molten state.

After the polymerization reaction is complete, and the polymer has been removed, the liquid polymerization diluent is recovered. In the past, liquid diluent, which preferably comprises N-methy-2-pyrrolidone, (NMP), was recovered in an extraction column, wherein the NMP diluent was separated from a brine mixture comprising mainly water, sodium chloride and NMP. In the NMP extraction recovery process, brine mixture is charged to the upper portion of the extraction column which is equipped with a suitable packing material or conventional perforated trays. An extractant, preferably n-hexanol, is introduced in the lower portion of the extraction column, so as to flow upwardly to extract NMP from the brine feed mixture. Distilled or deionized water is injected into the extraction column at a point above the brine feed to wash the extract, so as to remove traces of sodium chloride. The bottom rafinate, comprising water and dissolved sodium chloride is passed, for example, to a brine well for disposal. The overhead extractant comprising n-hexanol, NMP, a minor quantity of sodium chloride and water carried over with the NMP from the NMP extraction column is passed to fractional distillation for recovery of both organic phases which are then recycled.

Optionally, the brine can be concentrated by partial evaporation of water before it is fed into the extraction column. This optional step enhances the extraction efficiency based on the well known "salting out" effect.

While the above described extraction plus fractional distillation process has been utilized in commercial operation, a problem often arises in that salt carried over with the NMP diluent from the extraction column can cause corrosion in downstream conduits and vessels.

Generally speaking, there are inherent economic considerations for achieving high salt removal from a brine stream an extraction plus distillation operation such that the distillation step is considered to be economical only for processing brine streams having high salt levels and where the distillation unit does not have to produce a high purity stream. Under these circumstances, the distillation can efficiently operate at a lower product purity level.

On the other hand, ion exchange units for absorbing inorganic constituents from aqueous material are considered to be more suitable for effecting separations which produce a high purity product. Accordingly, a salt removal method which effectively integrates extraction plus ion exchange operations would be highly desirable for recovering liquid diluent in a polymerization process.

It is therefore an object of this invention to provide an improved method for recovering polymerization diluent having a low salt content, which employs both extraction and ion exchange operations.

It is a further object of this invention to provide a method of removal of salt from a brine stream which is effective, efficient, safe and economical.

It is yet another object of this invention to recover a liquid diluent stream having a low salt content and which is suitable for recycle in a polymerization process.

SUMMARY OF THE INVENTION

In accordance with this invention, a process is provided for recovering liquid diluent having a low salt content from a polymerization process, and wherein the recovered diluent can be economically recycled in the polymerization process. The diluent is recovered from an organic/aqueous mixture which contains significant quantities of diluent, an alkali metal salt and water. The diluent recovery is effected by utilizing an integrated process which joins extraction and ion exchange steps with a subsequent reaction for the conversion of an alkali metal hydroxide.

The process for recovering a liquid polymerization reaction diluent from an organic/aqueous mixture containing the polymerization diluent along with significant quantities of an alkali metal salt and water, comprises the following steps performed in the sequence set forth below:

(a) extracting essentially all of the polymerization diluent from the organic/aqueous mixture in an extraction column employing an extractant material, so as to produce an extract mixture predominantly containing the polymerization diluent and extractant material and further containing minor quantities of the alkali-metal salt and water;

(b) converting a substantial portion of the alkali metal salt in the extract mixture to an alkali metal hydroxide in the presence of an ion exchange resin, so as to produce an exchange mixture predominantly containing the polymerization diluent and extractant material, and also containing minor quantities of the alkali metal hydroxide and water;

(c) removing essentially all of the water and converting at least a first portion of the alkali metal hydroxide contained in the exchange mixture to an alkali metal salt of aminocarboxylic acid in a first fractional distillation column; and (d) removing extractant material and converting essentially all of the remaining alkali metal hydroxide in the exchange mixture to an alkali metal salt of aminocarboxylic acid in second fractional distillation columns.

In a preferred embodiment in this invention, the overhead extract mixture from the extraction column is further separated by cooling and settling so as to form an upper organic phase and a lower aqueous phase in a settling tank prior to subjecting the organic phase to ionic exchange. The aqueous phase, now more concentrated in salt compared to the organic phase, is recycled to wash the extract in the extraction column. Essentially all of the remaining salt in the organic phase is removed by utilizing anionic exchange procedures and subsequent purification of the liquid organic phase.

Further in accordance with this invention, an ion exchange resin in the hydroxide form is selected for this particular exchange of ions in this particular organic/aqueous mixture. The selection is made as a result of tests performed on sample mixtures of NMP/hexanol/water, which determined stability and salt removal capacity of the ion exchange resin.

Further aspects and additional advantages of this invention will be apparent from the following detailed description of the preferred embodiment of the invention as illustrated by the drawing in which:

DETAILED DESCRIPTION OF THE PREFERRED EMBODIMENT

Figure 1:
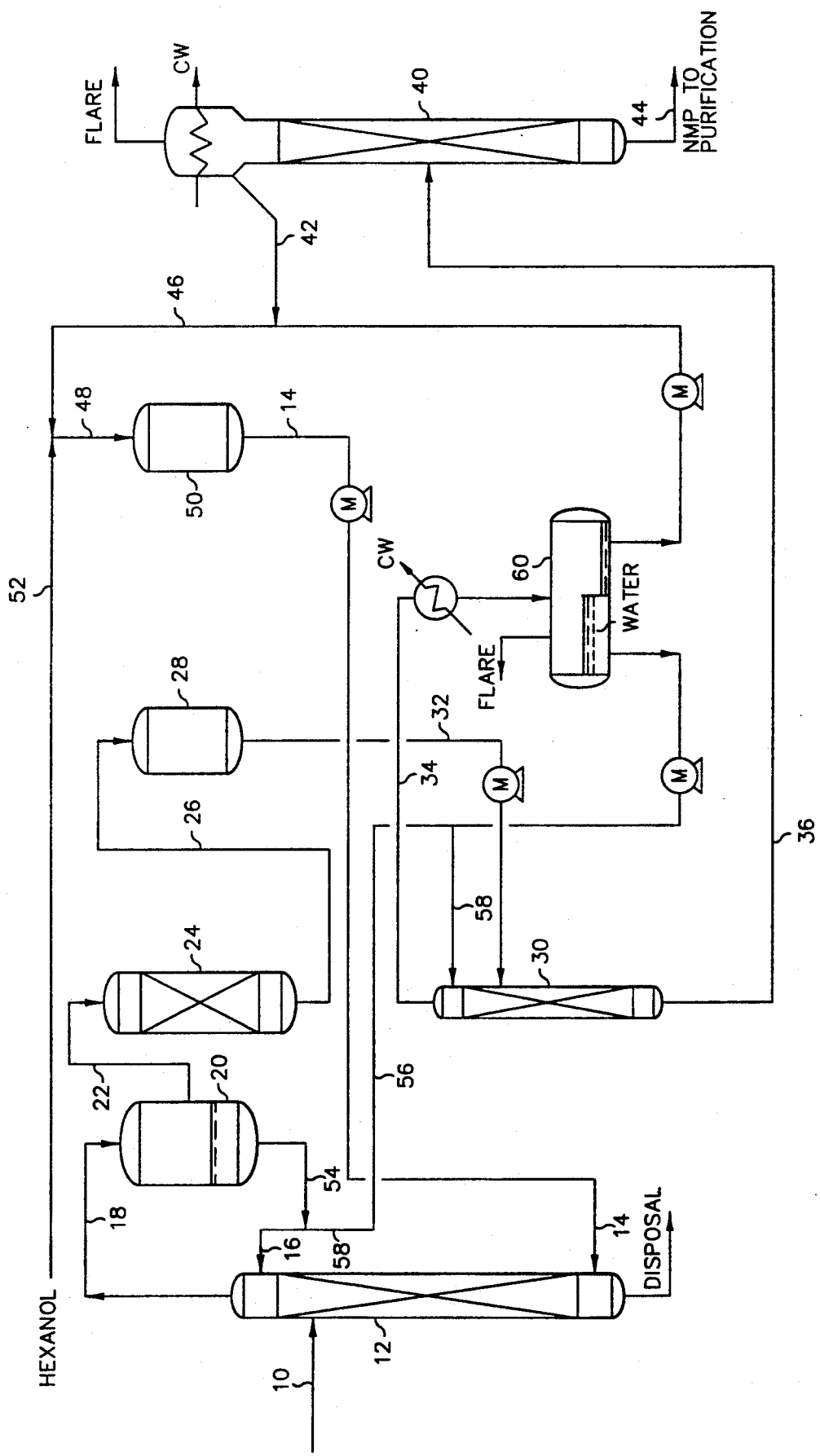
FIG. 1 is a schematic diagram illustrating process flow of the integrated diluent recovery process according to the invention.

A preferred embodiment of the present invention is illustrated and described in terms of recovering NMP from a brine mixture in a polymerization process for the production of arylene sulfide polymers. However, the particular flow scheme illustrated for the particular polymerization diluent or extractant material or ion exchange resin illustrated or described is not meant to limit the scope of the claims, since the invention is applicable to recovering other valuable organic polymerization diluents from a mixture containing salt and water.

It should also be understood that the representative temperatures and pressures set forth herein, with relation to the description of the drawings or examples, are illustrative only and not meant to be considered to be limiting since the particular temperatures and pressures utilized in a particular separation will be dependent on the nature and composition of the feed mixture.

It will be appreciated by those skilled in the art that since FIG. 1 is schematic only, many items of equipment which would be needed for successful operation of a commercial plant have been omitted for the sake of clarity. Such items of equipment would include, for example, temperature, flow and pressure measurement instruments and corresponding process controllers, additional pumps, heat exchangers, valves, etc. All of these items would be provided in accordance with standard chemical engineering practice to maintain desired conditions throughout the process and are not necessary to describe the present invention.

An essential feature of the present invention is directed to integrating a combination of separation steps which will recover a polymerization diluent having a low salt content from an organic/aqueous mixture containing the diluent, water and salt.

In the initial separation step, the polymerization diluent, which is preferably NMP but can be any suitable diluent, such as disclosed in above cited reference to Scoggins et al., is extracted from the initial mixture by an extraction column employing n-hexanol as an extractant material but which can be any suitable extractant material, as is well known in the art. The extract from the initial separation by extraction now containing, for example, 70 wt% 1-hexanol, 15 wt% water and further containing 200-400 mg salt/kg extract is sufficiently cooled so as to form two phases in a settling tank for the purpose of concentrating the salt. An organic phase, which is formed in an upper layer of the settling tank predominantly comprises NMP and n-hexanol but also contains minor amounts of salt and water, is passed to an anionic exchange column for conversion of the alkali metal salt to its hydroxide. An aqueous phase, which is formed in the lower layer of the settling tank comprises water, NMP and an increased concentration of salt compared to the upper layer, is recycled to the extraction column to wash traces of salt from the extract.

In the ion exchange column, further removal of an alkali metal salt, such as sodium chloride, from the organic phase withdrawn from the settling vessel is facilitated by exchanging chlorine ions for hydroxyl ions form an alkali-metal hydroxide (e.g. NaCl converted to NaOH). The alkali-metal hydroxide further begins to react with the NMP, under suitable conditions which are present in a following fractional distillation dewatering column, to form an alkali-metal salt of aminocarboxylic acid for example, sodium N-methyl-4-aminobutyrate (SMAB) which can pass harmlessly through the detwatering column for removal at suitable conditions found in a further following fractional distillation step.

Any suitable ion exchange resin having capacity for removing chlorine ions, and which is stable in the organic/aqueous mixture of diluent, extractant and salt, may be utilized in the present invention. Selection of a suitable strongly basic anion exchange resin, however, is an essential feature of the present invention. All of the considered ion exchange resins are cross-linked polystyrene which should have good chemical resistance. Preferred ion exchange resins, which are commercially available from Rohm and Haas, Philadelphia, Pa. include Amberlyst ® A-27 and Amberlyst ® A-26. Ion exchange resins in the halide form, such as chloride can be converted to the hydroxide form by treatment with dilute aqueous sodium hydroxide for use in removing chlorine ions from solution. Used ion exchange beds can also be regenerated by the dilute aqueous sodium hydroxide treatment.

After dewatering the ion exchange mixture, hexanol is removed and conversion of the remaining alkali-metal hydroxide to the SMAB is completed in a fractional distillation column for hexanol recovery. In a manner similar to the dewatering column, the SMAB passes harmlessly through the hexanol recovery column for removal in a subsequent dual distillation NMP purification system prior to recycling the NMP to the polymerization reactor.

Referring now to FIG. 1, a brine solution containing NMP is introduced through conduit 10 to the upper portion of an extraction column 12, which is equipped with suitable packing material or conventional perforated trays. The feed stream in conduit 10 could have for its origin, for example, the filtered effluent from an dilution tank in a polymerization process, in which case it would comprise mainly water, sodium chloride and NMP. An extractant material, preferably n-hexanol, is provided through conduit 14 into the lower portion of extraction column 12. The NMP is extracted from the feed mixture at any suitable temperature and pressure by the upward flow of the n-hexanol. In a pilot plant operation utilizing the process flow scheme illustrated in FIG. 1, NMP was extracted from a brine mixture at a temperature of about 85° C. and at a gage pressure of about 240 kPa.

A brine stream containing a quantity of dissolved sodium chloride is recycled via conduit 16 to the extraction column 12, at a point above the brine feed entry 10, to wash the extract withdrawn via conduit 18, thereby removing traces of sodium chloride from the extract. The bottom rafinate from extraction column 12, comprising water and a relatively high concentration of sodium chloride can be passed, for example, to a brine well for disposal.

The extract from the initial separation containing, for example, 70 wt% 1-hexanol, 15 wt% NMP, and 15 wt% water and further containing 200–400 mg salt/kg extract is withdrawn from the extraction column 12 via conduit 18, cooled and then passed to a settling tank 20. In the aforementioned pilot plant operation, the extract was withdrawn from the extraction column 12 at a temperature of about 82° C. and then cooled to a temperature of about 20°–35° C. in settling tank 20. The organic phase formed in the upper portion of settling tank 20 essentially consisting of NMP and 1-hexanol with minor quantities of sodium chloride and water is withdrawn through conduit 22 and passed to a column 24 containing a basic anion exchange resin bed with the resin in the hydroxide form.

In column 24, ion exchange occurs between the aqueous solution and the anion exchange resin as a solution passes down the column, such that chlorine ions are exchanged for hydroxyl ions thus forming sodium hydroxide which is withdrawn from column 24 in admixture with NMP and 1-hexanol via conduit 26. If desired, two ion exchange columns having a suitable valve arrangment could be employed so that one ion exchange column could be on regeneration while the other column was active.

An admixture essentially comprising NMP, 1-hexanol, sodium hydroxide and water is withdrawn from the ion exchange column 24 and passed to an extract surge tank 28 via conduit 26. From the surge tank 28, the mixture is introduced into the central portion of a fractional distillation column 30 via conduit 32 as the feed mixture for fractionator 30. Fractionator 30 is operated at conditions which produce an overhead fraction of water vapor which is withdrawn via conduit 34 and a bottoms fraction predominantly comprising NMP and 1-hexanol which is withdrawn via conduit 36. Further, in fractionator 30, conditions are sufficient for reacting at least a portion of the sodium hydroxide, present in the feed mixture for fractionator 30, with NMP to form SMAB which is withdrawn from fractionator 30 is the bottom stream 36 in admixture with NMP and 1-hexanol. The bottoms mixture withdrawn from fractionator 30 via conduit 36 is introduced into the central portion of fractional distillation column 40 via conduit 36 as the feed mixture for fractionator 40. Fractionator 40 is operated at conditions which produce an overhead fraction of 1-hexanol which is withdrawn via conduit 42 and a bottoms fraction predominantly comprising NMP but also containing SMAB and possibly other impurities is withdrawn via conduit 44. The hexanol withdrawn in conduit 42 is recycled to extraction column 12 via the combination of coduits 42, 46, 48, the hexanol surge tank 50 and conduit 14.

The NMP withdrawn in conduit 44 is passed to an NMP dual distillation purification process, not illustrated in FIG. 1, where SMAB and other impurities are removed and disposed of prior to recycling the thus purified NMP to a storage and handling system for the polymerization process. Further illustrated in FIG. 1 is the makeup hexanol which is supplied, for example, from drums via conduit 52. The recycle of the brine water to the extraction column 12 from settling tank 20 via conduits 54, 58 and 16 and from the dewatering accumulator 60 via conduits 56, 58 and 16 is also illustrated in FIG. 1.

The following examples illustrating selection of an anion exchange resin and the particular separations required in the present invention are presented in further illustration of the invention and are not to be considered as unduly limiting the scope of this invention.

In the following examples, surface area and average pore diameter for the various resins tested are as follows:

| Resin | Surface area (dry resin) | Pore diameter (average) |
|---|---|---|
| Amberlyst ® A-15 | 50 m²/g | 240 Angstrom |
| Amberlyst ® A-27 | 65 m²/g | 600 Angstrom |
| Amberlyst ® A-26 | 25–30 m²/g | 400–700 Angstrom |

When the ion exchange resin is provided in the chloride form, it has been converted to the hydroxide form by treatment with sodium hydroxide. Also, it is noted that conventional techniques for the removal of foulant materials and poisons by regeneration procedures, long used in commercial resin exchange applications, can be employed in such regeneration.

EXAMPLE 1

In this example, the selection of an ion exchange resin for a particular application is described. For testing the various resins, a 30–40 gram sample of each resin being considered was placed in an 118 mL container which was then filled with a solution of 14 weight percent water, 16 weight percent NMP and 70 weight percent hexanol. Each container was closed and then exposed to an elevated temperature of about 66° C., which approximates actual process conditions. Each sample was maintained at the elevated temperature for one week. Condition of each sample after one week exposure to a temperature of 66° C. is illustrated in Table 1.

TABLE I

| RESIN | Resin Condition END OF TEST CONDITION |
|---|---|
| Dowex ® MSC-1 | disintegrated |
| Dowex ® MSA-1 | disintegrated |
| Amberlyst ® 15 | disintegrated |
| Amberlyst ® A-26 | normal |

As shown in Table 1, all resins except Amberlyst ® A-26 had disintegrated into powder after one week exposure in the test solution at 66° C.

EXAMPLE 2

Further testing of the acceptable resin found in Example 1, along with another untested resin called Amberlyst® A-27 is described in this example, in which samples of the two resins under consideration were placed in solution in the same manner as in Example 1. This test, however, was for an ambient temperature carried out for a longer period of time. Each sample solution of resin was allowed to stand at room temperature, for example about 25° C., for a period of five months. During this chemical exposure at room temperature, no visible changes in resin appearance was noted, thus indicating that both resins were stable to the chemicals at these conditions.

EXAMPLE 3

This example demonstrates a separation made on a sample taken from the overhead extract stream in conduit 18 from the brine/NMP extraction column 12 for separating the extract into two phases for partial salt removal. A sample portion of the overhead stream from the extraction column 12 containing water, 1-hexanol, NMP, and salt was placed in a separatory funnel at room temperature of about 25° C. and the two layers separated. Both layers were analyzed for their chemical composition and the results are shown in Table II. The lower aqueous layer contained a substantial amount of salt. This example shows that a phase separation of the extract does remove a significant portion of the salt from the extract mixture.

TABLE II

| | Salt Concentration - WT % | |
|---|---|---|
| Component | Organic | Aqueous |
| Water | 13 | 68 |
| NMP | 16 | 30 |
| 1-hexanol | 71 | 2 |
| Salt | 110 mg/kg | 5500 mg/kg |

EXAMPLE 4

An anion exchange column was used to remove chloride from a mixture of NMP, water, 1-hexanol and salt in a continuous process. A glass column 16.6 centimeters high and 2.5 centimeters diameter was filled with Amberlyst® A-26OH resin to a height of 15.2 centimeters. A feed tank containing 70 weight percent 1-hexanol, 15 weight percent NMP, 15 weight percent water and 110 mg salt/kg solution was pumped through the anion exchange column at room temperature (about 25° C.) at a rate of 4100 mL/min. Samples were collected each hour during the run and analyzed for chloride content by titrating the samples with an aqueous silver nitrate solution. The results in Table III show that the chloride level is decreased by the anion exchange resin.

TABLE III

| | Chloride Exchange |
|---|---|
| Sample time - hr | Chloride Content - mg/kg |
| 1 | 14 |
| 2 | 17 |
| 3 | 18 |
| 4 | 25 |
| 5 | 31 |
| 6 | 32 |
| 7 | 37 |

EXAMPLE 5

This example demonstrates that the reaction of sodium hydroxide with NMP takes place under conditions found in the dewatering column 30. Samples collected from the ion exchange column in Example 4 at 1, 2, 3 and 4 hours were used for this demonstration. A 9 weight percent solution of sodium hydroxide was prepared from each sample and the thus prepared samples were heated to about 104° C. for twenty minutes. The samples were then cooled to ambient temperature and the change in the solution pH for each heated sample after cooling to room temperature was determined. As shown in Table IV, the solution pH decreased from the initial value by reaction of the base with NMP.

TABLE IV

| | NaOH Treatment | |
|---|---|---|
| Sample time - hr. | Initial pH | Final pH |
| 1 | 12.05 | 11.07 |
| 2 | 12.35 | 10.96 |
| 3 | 12.50 | 11.59 |
| 4 | 12.22 | 11.19 |

EXAMPLE 6

This example illustrates operating flow rates, temperatures and pressures of a pilot plant process for NMP recovery according to FIG. 1. Table V below shows that temperature, pressure and flow rate utilized in the pilot plant size recovery system. The numbers in the left hand column of Table V refer to the referenced numerals of the conduits or vessels illustrated in the drawing FIG. 1.

TABLE V

| | Pilot Plant Operation | | |
|---|---|---|---|
| Reference | Temp. °C. | Press. (gage) kPa | Flow L/h |
| 10 | 93 | — | 57 |
| 12 | 85 | 240 | — |
| 14 | 93 | — | 76 |
| 16 | 13-79 | — | — |
| 18 | 82 | 240 | 89 |
| 20 | 21-35 | — | — |
| 28 | 77 | 140 | — |
| 30 | 146-204 | 170 | — |
| 32 | — | — | 89 |
| 36 | — | — | 72-80 |
| 40 | 183-232 | 15 | — |
| 42 | 183 | — | 61 |
| 44 | 232 | — | 11 |
| 46 | — | — | 68-83 |
| 50 | 66 | 48 | — |
| 58 | — | — | 15 |
| 60 | 43 | 170 | — |

The data in Table V show that the process of this invention is suitable for efficient recovery of polymerization diluent.

It is to be understood that reasonable variations and modifications for various usages and conditions are possible by those skilled in the art and such modifications and variations are within the scope of the described invention and the appended claims.

That which is claimed is:

1. A process for recovering a liquid polymerization reaction diluent having a low salt content from a mixture containing said diluent along with an alkali-metal salt and water, said process comprising the following steps performed in the sequence set forth below:

(a) extracting essentially all of said diluent from said mixture in an extraction column employing an extractant material so as to produce an extract mixture predominantly containing said diluent and said extractant material and further containing said alkali-metal salt and water;

(b) converting a substantial portion of said alkali-metal salt in said extract mixture to an alkali-metal hydroxide in the presence of an ion exchange resin so as to produce an exchange mixture predominantly containing said diluent and said extractant material and also containing said alkali-metal hydroxide and water;

(c) removing essentially all of the water and converting at least a first portion of said alkali-metal hydroxide contained in said exchange mixture to an alkali-metal salt of aminocarboxylic acid in a first fractional distillation column;

(d) removing essentially all of the extractant material and converting essentially all of the remaining alkali-metal hydroxide in said exchange mixture to an alkali-metal salt of aminocarboxylic acid in a second fractional distillation column; and (e) recovering said diluent having a low salt content from said second fractional distillation column.

2. A process in accordance with claim 1 additionally comprising the following step which is performed after step (a):

cooling said extractant mixture so as to form an organic layer and an aqueous layer in a settling tank and passing said organic layer for processing in step (b).

3. A process in accordance with claim 1 wherein said polymerization diluent is N-methyl-2-pyrrolidone (NMP); said extractant material is 1-hexanol and said alkali-metal salt is sodium chloride.

4. A process in accordance with claim 3 wherein said ion exchange resin comprises a cross-linked polystyrene material in the hydroxide form.

5. A process in accordance with claim 4 wherein said ion exchange resin is selected based on long term stability of said resin in an NMP/hexanol/water mixture.

6. A process in accordance with claim 3, wherein said alkali-metal hydroxide is sodium hydroxide (NaOH).

7. A process in accordance with claim 6 wherein said first and said second fractional distillation columns are operated at a temperature in a range of about 212°–350° F. for formation of sodium methyl-4-aminobutyrate (SMAB) by reacting NMP and NaOH.

8. A process in accordance with claim 1 wherein said extract mixture comprises about 70% by weight of 1-hexanol, about 15% by weight NMP and about 15% by weight water and further contains 200–400 ppm salt.

9. A process in accordance with claim 2 wherein said organic/aqueous mixture is introduced to the upper portion of said extraction column, said method additionally comprising recycling brine from said aqueous layer to said extraction column above the point of introduction of said organic/aqueous phase mixture.

* * * * *